3,099,612
CHLORINATION OF NITROALKANES
Louis A. Wilson, Terre Haute, Ind., assignor to Commercial Solvents Corporation, New York, N.Y., a corporation of Maryland
No Drawing. Filed Aug. 31, 1960, Ser. No. 53,030
5 Claims. (Cl. 204—158)

My invention relates to the chlorination of nitroalkanes. More particularly it relates to the production of non-geminal chlorinated nitroalkanes having the chlorine substituent in the one position by the chlorination of nitroalkanes.

Previously, non-geminal monochlorinated nitroalkanes which have the chlorine substituent in the one position have been prepared by the liquid phase reaction of chlorine with a nitroalkane in the presence of light. However, by this method it is impossible to obtain satisfactory yields of non-geminal 1-chloronitroalkanes without the use of extremely long reaction times.

I have now discovered that yields obtainable from the liquid phase chlorination procedure can be considerably improved even with a greatly reduced reaction time by carrying out the reaction in the presence of light having wave lengths of between 340 and 480 millimicrons, for instance about 360 to 430 millimicrons. I have found that for maximum yields wave lengths of from about 375 to about 425 millimicrons are preferable.

In carrying out my invention, the chlorination can be conducted in accordance with well-known practices for the liquid phase chlorination of aliphatic nitrohydrocarbons. I prefer, in carrying out the chlorination step of my invention to utilize an amount of chlorine in excess of the theoretical reactive amount in the reaction. For maximum results I prefer to utilize a mole ratio of chlorine to nitroalkane of about 10:1 to 0.5:1. Any suitable temperature can be utilized in my chlorination process. Generally, however, temperatures below the liquification point of chlorine and temperatures above which chlorine becomes substantially insoluble in the nitroalkane are not satisfactory. For maximum results, I prefer to utilize temperatures ranging from about 20 to about 40° C. The intensity of light in the wave lengths of 340 to 480 millimicrons necessary to produce satisfactory yields of non-geminal 1-chloronitroalkanes will vary depending on the particular nitroalkane to be chlorinated and the length of the reaction time desired. Generally, however, when the intensity of light is raised, reaction time is shortened.

My process is applicable to aliphatic nitrohydrocarbons in which the nitro group is attached to a non-terminal carbon. Examples of the nitroalkanes utilized in my process include 2-nitropropane, 2-nitrobutane, 3-nitropentane, 2-nitrohexane, 2-nitrodecane, 2-nitro-3-methylhexane, and the like.

The following examples are offered to illustrate my invention. However, I do not intend to be limited to the specific materials, portions, and procedures shown. Rather, I intend for equivalents obvious to those skilled in the art to be included within the scope of my invention.

EXAMPLE I

Substantially anhydrous chlorine was bubbled for nineteen hours through substantialy anhydrous 2-nitropropane in a quartz column 300 millimeters long, 40 millimeters in diameter, and having a wall thickness of 2 millimeters. The reaction mixture was subjected to light during the reaction from a 200-watt tungsten filament incandescent light spaced approximately 2 inches from the column walls. The heat supplied by the light maintained the reaction mixture at a temperature of about 38° C. At the conclusion of the 19-hour period, the mixture was distilled to recover unreacted 2-nitropropane and 1-chloro-2-nitropropane.

The same procedure was repeated with the exception that a 20-watt fluorescent lamp emitting light having 95% of the wave lengths of between 380 and 420 millimicrons was utilized. The table below shows the yields obtained.

Table I

| | Percent theoretical yield of 1-chloro-2-nitropropane |
|---|---|
| Chlorination with 200-watt filament lamp | 9 |
| Chlorination with 20-watt fluorescent lamp | 31 |

EXAMPLE II

Substantially anhydrous chlorine was bubbled for 36 hours through substantially anhydrous 2-nitropropane in a column 300 millimeters long, 40 millimeters in diameter, and having a wall thickness of 2 millimeters. The reaction mixture was subjected to light from a 20-watt fluorescent lamp which emitted light having wave lengths of between 340 and 480 spaced approximately 2 inches from the column walls. The heat supplied by the light maintained the reaction mixture at a temperature of about 40° C. At the conclusion of the reaction period, the mixture was distilled to recover unreacted 2-nitropropane and a yield of 55% of 1-chloro-2-nitropane.

EXAMPLE III

Following the procedure of Example II, 2-nitrohexane was reacted with chlorine and a yield of 52% of 1-chloro-2-nitrohexane was obtained.

EXAMPLE IV

Following the procedure of Example II, 3-nitropentane was reacted and a yield of 47% of 1-chloro-3-nitropentane was obtained.

EXAMPLE V

Following the procedure of Example II, 2-nitrobutane was reacted and a yield of 43% of 1-chloro-2-nitrobutane was obtained.

Now having described my invention, what I claim is:

1. In a process for the production of non-geminal chloronitroalkanes, wherein the chlorine substituent is in the one position by the chlorination of nitroalkanes, the improvement which comprises treating the nitroalkane with chlorine in the presence of light having a wave length predominantly of from about 340 to about 480 millimicrons.
2. The process of claim 1 wherein the wave length ranges from about 360 to about 430.
3. The process of claim 1 wherein the temperature ranges from about 20 to about 40° C.
4. The process of claim 1 wherein the nitroalkane is 2-nitropropane.
5. In a process for the production of non-geminal chloronitroalkanes, wherein the chlorine substituent is in the one position by the chlorination of alkanes, the improvement which comprises treating the nitroalkane with chlorine in mole ratios of chlorine to nitroalkane of from about 10 to 1 to 0.5 to 1 in the presence of light having a wave length predominantly in the range of from about 340 to about 480 millimicrons at a temperature ranging from about 20 to about 40° C. and recovering the thus produced chloronitroalkane.

References Cited in the file of this patent

UNITED STATES PATENTS 2,337,912    McBee et al. _____ Dec. 28, 1943